United States Patent
Nozawa

(10) Patent No.: US 10,864,684 B2
(45) Date of Patent: Dec. 15, 2020

(54) INTERNAL METALLIC TANK ASSEMBLY FOR HONEYCOMB STRUCTURAL HIGH-PRESSURE SET TANK AND A MANUFACTURING PROCESS THEREFOR

(71) Applicant: Tsukasa Nozawa, Tokyo (JP)

(72) Inventor: Tsukasa Nozawa, Tokyo (JP)

( * ) Notice: Subject to any disclaimer, the term of this patent is extended or adjusted under 35 U.S.C. 154(b) by 362 days.

(21) Appl. No.: 15/725,820

(22) Filed: Oct. 5, 2017

(65) Prior Publication Data
US 2019/0105851 A1    Apr. 11, 2019

(51) Int. Cl.
| | | |
|---|---|---|
| *B29C 65/00* | (2006.01) | |
| *B29C 53/60* | (2006.01) | |
| *B29D 24/00* | (2006.01) | |
| *B32B 3/12* | (2006.01) | |
| *B29C 53/58* | (2006.01) | |
| *B29C 70/86* | (2006.01) | |
| *B29C 70/32* | (2006.01) | |
| *B29C 65/48* | (2006.01) | |
| *B29C 71/00* | (2006.01) | |
| *B29L 31/00* | (2006.01) | |
| *B29K 105/08* | (2006.01) | |
| *B29K 705/00* | (2006.01) | |

(52) U.S. Cl.
CPC ........ *B29C 66/5452* (2013.01); *B29C 53/582* (2013.01); *B29C 53/602* (2013.01); *B29C 66/63* (2013.01); *B29C 70/32* (2013.01); *B29C 70/865* (2013.01); *B29D 24/005* (2013.01); *B32B 3/12* (2013.01); *B29C 53/605* (2013.01); *B29C 65/481* (2013.01); *B29C 71/0009* (2013.01); *B29K 2105/0872* (2013.01); *B29K 2705/00* (2013.01); *B29L 2031/7156* (2013.01); *Y10T 428/13* (2015.01); *Y10T 428/131* (2015.01)

(58) Field of Classification Search
CPC ... B29C 53/602; B29C 66/5452; B29C 66/63; B29C 71/0009; B29C 53/582; B29C 53/605; B29C 65/481; B29C 70/32; B29C 70/865; B29D 24/005; B32B 3/12; B29K 2105/0872; B29K 2705/00; B29L 2031/7156; Y10T 428/131; Y10T 428/13
See application file for complete search history.

(56) References Cited

U.S. PATENT DOCUMENTS

| | | |
|---|---|---|
| 3,537,416 A | 11/1970 | Cowles |
| 3,641,230 A | 2/1972 | Jenks |
| 4,063,999 A | 12/1977 | Wade |
| 4,476,988 A | 10/1984 | Tanner |
| 5,174,466 A * | 12/1992 | Matyja ................. B65D 90/046 220/62.21 |
| 6,638,348 B2 | 10/2003 | Kuriiwa et al. |

(Continued)

FOREIGN PATENT DOCUMENTS

| | | |
|---|---|---|
| EP | 1520683 | *  2/2008 |
| JP | 2001-287290 | 10/2001 |

(Continued)

*Primary Examiner* — Yan Lan
(74) *Attorney, Agent, or Firm* — Juan Carlos A. Marquez; Marquez IP Law Office, PLLC

(57) ABSTRACT

The present invention is directed to a new concept for an internal metallic tank of large-scale high-pressure gasholder in which pluralities of internal tanks have been accumulated like a honeycomb structure and for the manufacturing processes of the internal metallic tank.

9 Claims, 14 Drawing Sheets

Cross Section

(56) References Cited

U.S. PATENT DOCUMENTS

| | | | |
|---|---|---|---|
| 7,137,526 B2 * | 11/2006 | Sakaguchi | B23P 11/02 220/601 |
| 8,006,841 B2 | 8/2011 | Bontemps et al. | |
| 8,917,809 B2 | 12/2014 | Nozawa | |
| 2004/0145079 A1 | 7/2004 | Lin et al. | |

FOREIGN PATENT DOCUMENTS

| | | | |
|---|---|---|---|
| JP | 4862975 B2 | | 1/2012 |
| JP | 2017101763 | * | 6/2017 |
| WO | 01/57354 A2 | | 8/2001 |
| WO | 2010/057089 A1 | | 5/2010 |

\* cited by examiner

INTERNAL METALLIC TANK ASSEMBLY FOR HONEYCOMB STRUCTURAL HIGH-PRESSURE SET TANK AND A MANUFACTURING PROCESS THEREFOR

BACKGROUND OF THE INVENTION

Field of the Invention

This invention is concerned with an internal metallic tank of large-scale high-pressure gasholder in which pluralities of internal tanks have been accumulated like a honeycomb structure.

Description of the Prior Art

U.S. Pat. No. 8,917,809 B2 and NOZA-006 show an idea of a large-scale high-pressure gasholder accumulated in the honeycomb structure. The internal tanks of "U.S. Pat. No. 8,917,809 B2" and "NOZA-006" are manufactured from plastic. The reason is that the internal tank of "U.S. Pat. No. 8,917,809 B2" and "NOZA-006" is not only a high-pressure gasholder but also a pressuring device for the piled FRP prepreg. Therefore, it is necessary that every internal tank of "U.S. Pat. No. 8,917,809 B2" and "NOZA-006" swell like a balloon by internal air pressure.

A metal tank in the prior art for the high-pressure gas does not expand enough by internal air pressure by the steam and alcoholic steam of "U.S. Pat. No. 8,917,809 B2". The reason is that the wall of a metal tank for the high-pressure gas in the prior art is made thick and rigid because of safety. Compared with it, the tank made of plastic expands easily by internal air pressure. Therefore, the internal tank of "U.S. Pat. No. 8,917,809 B2" is made of plastic.

However, high-pressure gas of small molecule has possibility of penetrating the wall of plastic tank. It is preferable that the wall of a high-pressure tank, in which a gas of small molecule is stored, is made of metal. "U.S. Pat. No. 8,917,809 B2" and "NOZA-006" need some new technologies when an internal tank is manufactured from metal.

Problems the Invention is Solving

"U.S. Pat. No. 8,917,809 B2" and "NOZA-006" show the idea of the large-scale high-pressure gasholder accumulated in the honeycomb structure. It is a method of pressurizing FRP prepreg at the same time as heating. The internal tanks of "U.S. Pat. No. 8,917,809 B2" and "NOZA-006" are not only a high-pressure gasholder but also a pressuring device for the FRP prepreg. Therefore, it is necessary that the internal tanks of "U.S. Pat. No. 8,917,809 B2" and "NOZA-006" swell like a balloon by internal air pressure. However, a metal tank in the prior art for the high-pressure gas does not expand enough by the internal air pressure of the steam and the alcoholic steam shown in "U.S. Pat. No. 8,917,809 B2" and "NOZA-006". The reason is that the wall of a metal tank for the high-pressure gas in the prior art is too thick to expand.

There are two methods by which an internal metallic tank can be swollen by using the air pressure of the steam and the alcoholic steam shown in "U.S. Pat. No. 8,917,809 B2". One method is to raise the internal tank pressure shown in "U.S. Pat. No. 8,917,809 B2". And another one is to make the wall thickness of internal metallic tank thin compared with the prior art.

If it wants to raise the internal pressure of the tank shown in "U.S. Pat. No. 8,917,809 B2", it only has to add bicarbonate of soda and the citric acid in addition to water and alcohol. According to this method, an internal tank made of stainless steel of 66 mm in inside diameter and 2.0 mm wall thickness can be expanded. The single high-pressure trial tank made by this method clears 70 M Pascal by a simple hydraulic pressure examination. However, this method cannot be applied to a large-scale set tank where a lot of internal tanks are tied continuously. When industrially mass-producing, it is necessary to develop a metallic internal tank where the tank wall is thin compared with the tank of prior art.

Technological development to use a metallic tank as an internal pressurizing device is not easy. First of all, it is necessary to design an internal metallic tank where enough expansion pressure is generated by some reasonable air pressure. When a cylindrical high-pressure tank is pressurized by internal pressure, circumference stress and axial stress are generated on the tank wall. Theoretically, the circumference stress is twice the axial stress. Circumference stress generated in a cylindrical tank is decided by internal pressure, diameter and wall thickness. Usually, strength of high-pressure cylindrical tank is calculated by circumference stress. So, it is necessary to decide the diameter of the cylindrical tank and the wall thickness that are corresponding to internal pressure.

Next, it is necessary to design a connection fitting adhered to both ends of an internal metallic tank. Silver brazing or welding is preferable for fixing the connection fitting because silver brazing or welding can keep airtight. However, silver brazing or welding cannot resist high pressure of the tank because the wall of the metallic tank in this invention is too thin to keep the connection fitting adhered to the tank. This problem is fatally important.

Connection fittings are installed at both ends of a cylindrical tank. The terminal of a cylindrical tank is domed. Therefore, a big transformation stress is generated to the connection fitting adhered at a domed point. This transformation stress destroys the silver brazing or the welding easily, and it ruins the airtight of the metallic tank. Connection area where the domed cylindrical tank and the connection fitting are joined by silver brazing or welding needs reinforcement.

In addition, the connection fitting which is adhered to the cylindrical tank with brazing or welding is easily pushed out from the metallic tank by internal pressure. The reason is that the wall thickness of the metallic tank in this invention is too thin to hold the connection fitting. Connection fitting needs some another method to be fixed to the internal tank more strongly than brazing or welding. To solve this problem, the overall reinforcement method for the metallic tank assembly including how to wrap the FRP prepreg bandage around tank is devised.

SUMMARY OF THE INVENTION

The new invention described herein is directed to improving the material structure and the manufacturing processes disclosed in U.S. Pat. No. 8,917,809 B2 and NOZA-006.

There are two kinds of specifications demanded of the INTERNAL METALLIC TANK ASSEMBLY FOR HONEYCOMB STRUCTURAL HIGH-PRESSURE SET TANK. One is a specification demanded when manufacturing. Another one is a specification demanded when examining strength. The Internal Metallic Tank Assembly For Honeycomb Structural High-Pressure Set Tank should satisfy both specifications.

A. In this invention, the specification demanded is as follows when manufacturing.
  (1) All materials which composes Internal Metallic Tank Assembly For Honeycomb Structural High-Pressure Set Tank should endure the high temperature of 130° C.-200° C. for two hours or more.
  (2) Internal metallic tank that composes Internal Metallic Tank Assembly For Honeycomb Structural High-Pressure Set Tank should expand by internal pressure of 20-bar like a balloon.
  (3) The internal metallic tank that composes Internal Metallic Tank Assembly For Honeycomb Structural High-Pressure Set Tank should keep airtight for two hours or more at the environment of ambient temperature 130° C.-200° C. and internal pressure of 20-bar.
B. In this invention, the specification demanded is as follows when examining strength
  (1) The Internal Metallic Tank Assembly For Honeycomb Structural High-Pressure Set Tank should keep airtight at the environment of internal pressure 1000-bar in room temperature.

It is necessary to design a new metallic tank where enough expansion pressure can be generated by the air pressure. When the ratio of the tank diameter and the wall thickness is 100:1 or more, the internal pressure of 20-bar obtains complete expansion pressure for a metallic tank. However, when the wall thickness of the tank is thin, the gas with small molecular weight like the hydrogen gas might penetrate the wall. It is necessary to optimize the ratio between the tank diameter of a metallic tank and the wall thickness, by the parameter of stored gas, inside pressure, and weight of the tank assembly.

Specs of a metallic tank in the prior art and in this invention are shown below.
  1. Typical specs of the high-pressure air tank in the prior art are as follows.
    (A) Material: SUS304
    (B) Internal pressure: 20-bar
    (C) Inside diameter: ϕ 66 mm
    (D) Wall thickness: 2.0 mm
    (E) The ratio of the inside diameter and the wall thickness is about "30:1".
  2. Specs of the new designed metallic internal tank are as follows.
    (A) Material: SUS304
    (B) Internal pressure: 20-bar
    (C) Inside diameter: ϕ 70 mm
    (D) Wall thickness: 0.5 mm
    (E) The ratio of the inside diameter and the wall thickness is about "140:1".

A connection fitting adhered to both sides of a metallic internal tank is newly designed. Silver brazing or welding is preferable for fixing the connection fitting because silver brazing or welding can keep airtight. However, silver brazing or welding cannot resist high pressure of the tank because the wall of the metallic tank is too thin to keep the connection fitting adhered. In this invention, the bottom shape of the connection fitting is designed to be larger than the diameter of connection coupling screw. The reason is that the base surface of connection fitting can be fixed by rolling FRP prepreg bandage to the metallic tank assembly.

The connection fittings are installed at both ends of a cylindrical tank. The terminal of the cylindrical tank is domed. Big transformation stress is generated to the connection fitting installed in the domed point. This transformation stress might destroy the silver brazing or the welding, and it would ruin the airtight of internal tank. The connection area where the domed metallic tank and the connection fitting are adhered needs reinforcement. In this invention, the point of the domed tank is reinforced with a ring parts made of metal.

Basically there is no structural strength in silver brazing or welding, no matter how the connection area is reinforced. The reason is that the wall of the metallic tank in this invention is too thin and the internal pressure is so high. The connection fitting, which is adhered to domed cylindrical tank with brazing or welding, is easily pushed out from the metallic tank by internal pressure. The connection fitting needs to be attached to the internal tank more strongly than brazing or welding. To solve this problem, the overall reinforcement method for the metallic tank assembly including how to wrap the FRP prepreg bandage around tank is devised. The most effective is the method where the base surface of connection fitting is rounded by FRP prepreg bandage in the direction of the tank length. However, it is not easy to roll the bandage axially of a long and slender cylinder. Then, a specializing method for AN INTERNAL METALLIC TANK ASSEMBLY FOR HONEYCOMB STRUCTURAL HIGH-PRESSURE SET TANK is devised.

The most effective method to fix the connection fitting to the metallic tank is to round the FRP prepreg bandage in the direction of length. There is no structural strength in silver brazing or welding, no matter how the connection area is reinforced. When FRP prepreg bandage is wrapped to draw spiral S-character at both ends of the tank, the surface of the tank is completely covered with the FRP prepreg bandage. The FRP prepreg bandage wrapping the tank is completely consecutive. To the result, a hoop stress is generated in the FRP prepreg bandage. Hoop stress is a tension stress. The FRP prepreg bandage endures the tension stress best. The following conditions are necessary to achieve this.
(1) The shape of metallic tank is cylindrical and its both ends are domed convex.
(2) And, a prop of cylindrical shape stands up at the center of the convex dome of the metallic tank.
(3) The cylindrical prop is manufactured in integrated with the base of connection fitting.

However, it is not easy to roll the bandage axially of a long and slender cylinder. Moreover, the stress in the direction of the circumference is generated in a high-pressure tank. Theoretically, the circumference stress generated in a cylindrical tank by internal pressure is twice the stress in the direction of the length. To solve these problems, overall reinforcement is done for the metallic tank assembly including how to wrap the FRP prepreg bandage around tank.
(1) It separately deals with the axial stress and the circumference stress.
  1. It corresponds to the axial stress by the method as follows. When long FRP prepreg bandage is wrapped to draw spiral S-character at both ends of the tank, the surface of the tank is completely covered with the FRP prepreg bandage. The long FRP prepreg bandage wrapping the tank is completely consecutive. To the result, a hoop stress is generated in the FRP prepreg bandage. Hoop stress is a tension stress. The FRP prepreg bandage endures the tension stress. However, this method cannot resist the stress in the direction of the circumference.
  2. It corresponds to the stress of the circumference by the method as follows. When long FRP prepreg bandage is rolled around the tank, the straight surface of the tank is reinforced with the FRP prepreg bandage. The long FRP prepreg bandage wrapping the tank is completely consecutive. To the result, a hoop stress is generated in the FRP prepreg bandage. Hoop stress is a tension stress. The FRP prepreg bandage endures the tension stress. However, the domed part at both ends of the tank is not reinforced in this method.

(2) All problems are not solved only by the spiral S-character rolling and the circumference rolling. Some middle material that mediates the both is necessary. Then, a domed molding is newly designed. The domed molding is manufactured from a thermoplastic resin and it has three purposes.
1. The domed molding strengthens the domed part that is not reinforced by the method of rolling the bandage around the cylinder.
2. The domed molding prevents the connection fitting from being pushed out from the metallic tank by internal pressure.
3. The domed molding increases the number of rolling of FRP prepreg bandages resisting the circumference stress of high-pressure tank.

This invention is only supplement of U.S. Pat. No. 8,917,809 B2 and NOZA-006. And, it is not difficult if the working is done as a procedure.

DESCRIPTION OF THE PREFERRED EMBODIMENT

The embodiments of the present invention will be described hereinbelow in conjunction with the above-described drawings. Referring to the attached drawings as follows, a concrete execution of the manufacturing process of an internal metallic tank of large-scale high-pressure gasholder in which pluralities of internal tanks have been accumulated like a honeycomb structure is explained.

Figure 1:
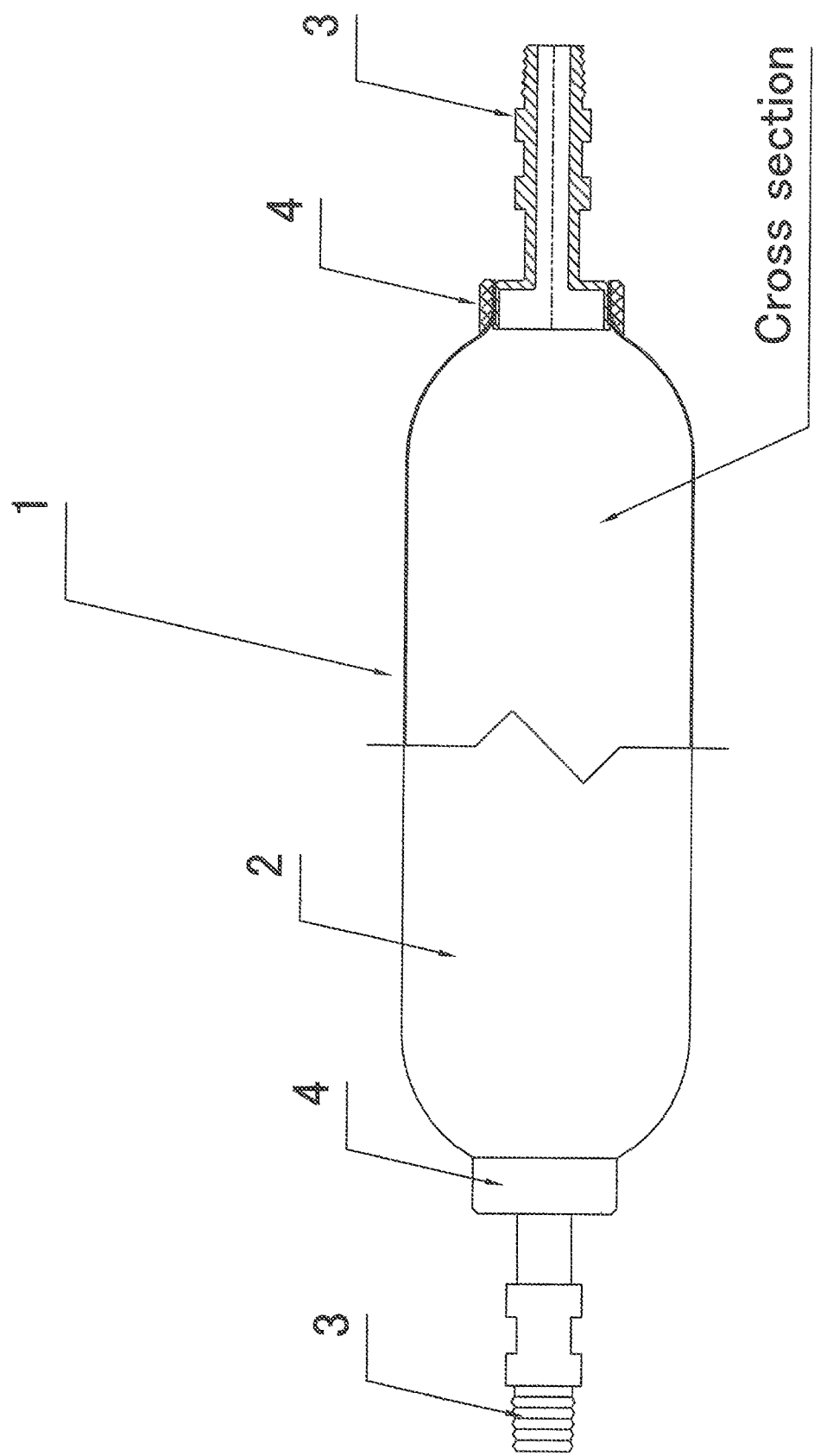
FIG. 1 shows a concept chart of Metallic Tank Assembly (1) using the references of (2) Metallic Tank, (3) Connection Fitting and (4) Reinforcement Ring.

FIG. 1 shows a concept chart of Metallic Tank Assembly (1). The Metallic Tank Assembly (1) is composed of Metallic Tank (2), Connection Fitting (3) and Reinforcement Ring (4). The right side of FIG. 1 is a cross section.

Metallic Tank (2) is made of the stainless steel, the aluminum alloy, and magnesium alloys, etc. The Metallic Tank (2) is designed so that the internal air pressure in the Metallic Tank (2) generates enough expansion pressure, which pressurizes piled FRP prepreg. It is preferable that the ratio of the Metallic Tank (2) diameter and the wall thickness is 50:1 or more, when the Metallic Tank (2) is pressurized to 20-bar.

Connection Fitting (3) is made of the stainless steel, the aluminum alloy, and magnesium alloys, etc. A penetration hole is open in the center of Connection Fitting (3). The penetration hole is extended wide at the bottom of Connection Fitting (3). The Connection Fitting (3) is attached to both ends of the Metallic Tank (2). The Connection Fitting (3) is joined to the Metallic Tank (2) by the silver brazing. Airtight is demanded to the processing of brazing.

Reinforcement Ring (4) is made of the stainless steel, the aluminum alloy, and magnesium alloys, etc. The Reinforcement Ring (4) reinforces the part where the Connection Fitting (3) is being joined to the Metallic Tank (2) by the silver brazing. The Reinforcement Ring (4) is bonded to the Metallic Tank (2) with a heatproof adhesive from outside of the Metallic Tank (2) after the Connection Fitting (3) is brazed to the Metallic Tank (2). The reason is that flaw detection inspecting of the silver brazing, which connects the Connection Fitting (3) to Metallic Tank (2), becomes difficult when the Reinforcement Ring (4) is attached.

Figure 2:
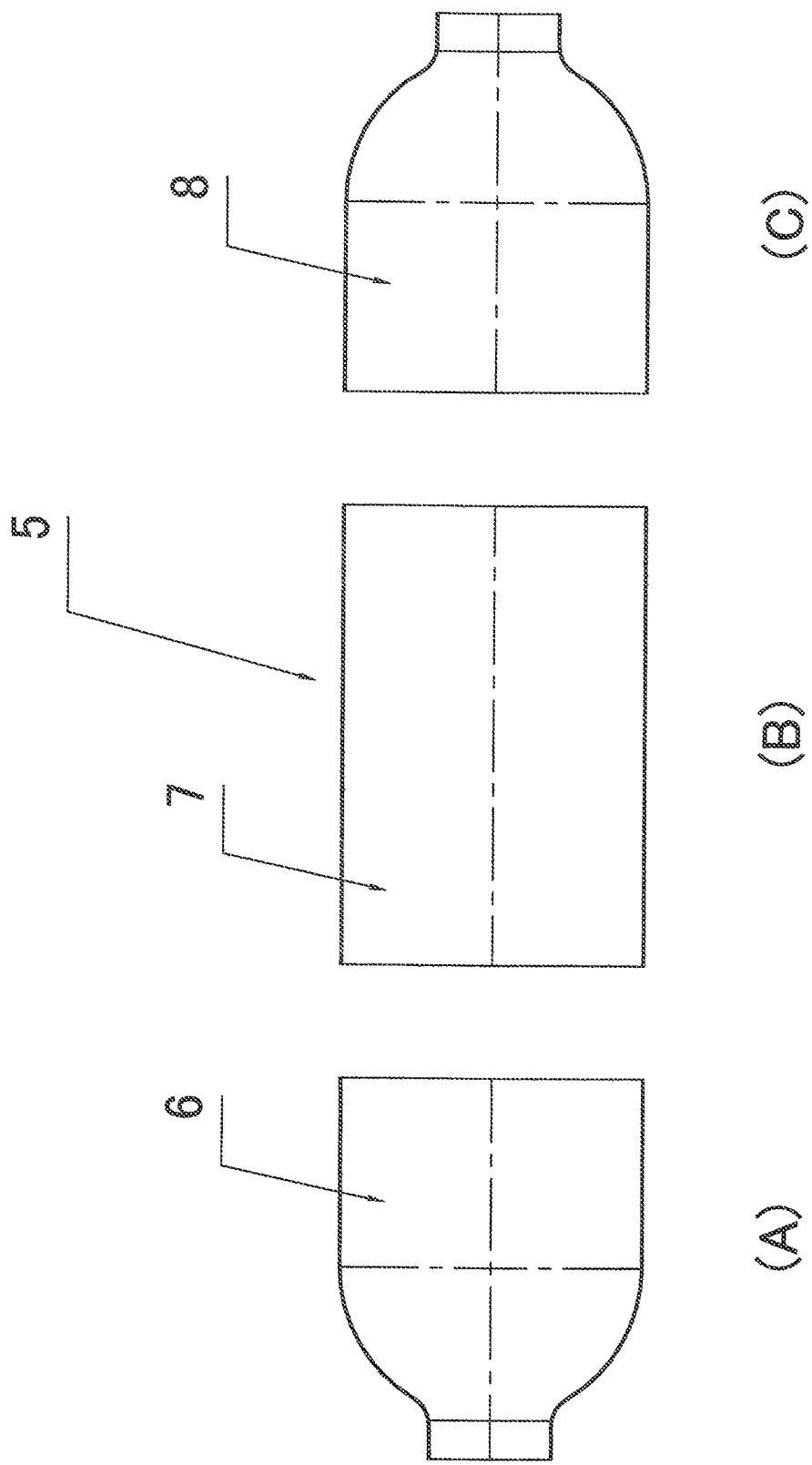
FIG. 2 (A), FIG. 2 (B) and FIG. 2 (C) show a concept chart of Metallic Tank Assembly (5) using the references of (6) Head Part, (7) Middle Part and (8) End Part.

FIG. 2 (A), FIG. 2 (B) and FIG. 2 (C) show a concept chart of Metallic Tank Assembly (5). The Metallic Tank Assembly (5) is composed of Head Part (6), Middle Part (7) and End Part (8).

Head Part (6), Middle Part (7) and End Part (8) are made of the stainless steel, the aluminum alloy, and magnesium alloys, etc. The Head Part (6) has shape that a short cylinder adheres to a domed bowl. There is a hole at the point of the domed bowl of the Head Part (6). The point of the Head Part (6) projects from the domed bowl. The Middle Part (7) is cylindrical. The diameter and the wall thickness of the Middle Part (7) are the same as the short cylinder of the Head Part (6). The End Part (8) and the Head Part (6) is the same. The Head Part (6), the Middle Part (7) and the End Part (8) are connected by the welding. There is no limitation in the length of the Middle Part (7). Therefore, the length of the Metallic Tank Assembly (5) has no limitation.

The wall thickness of the Metallic Tank Assembly (5) is thinned than the usual high-pressure tank in the prior art. It is preferable that the ratio of the diameter and the wall thickness of the Middle Part (7) is 50:1 or more, when the Metallic Tank Assembly (5) is pressurized to 20-bar.

Figure 3:
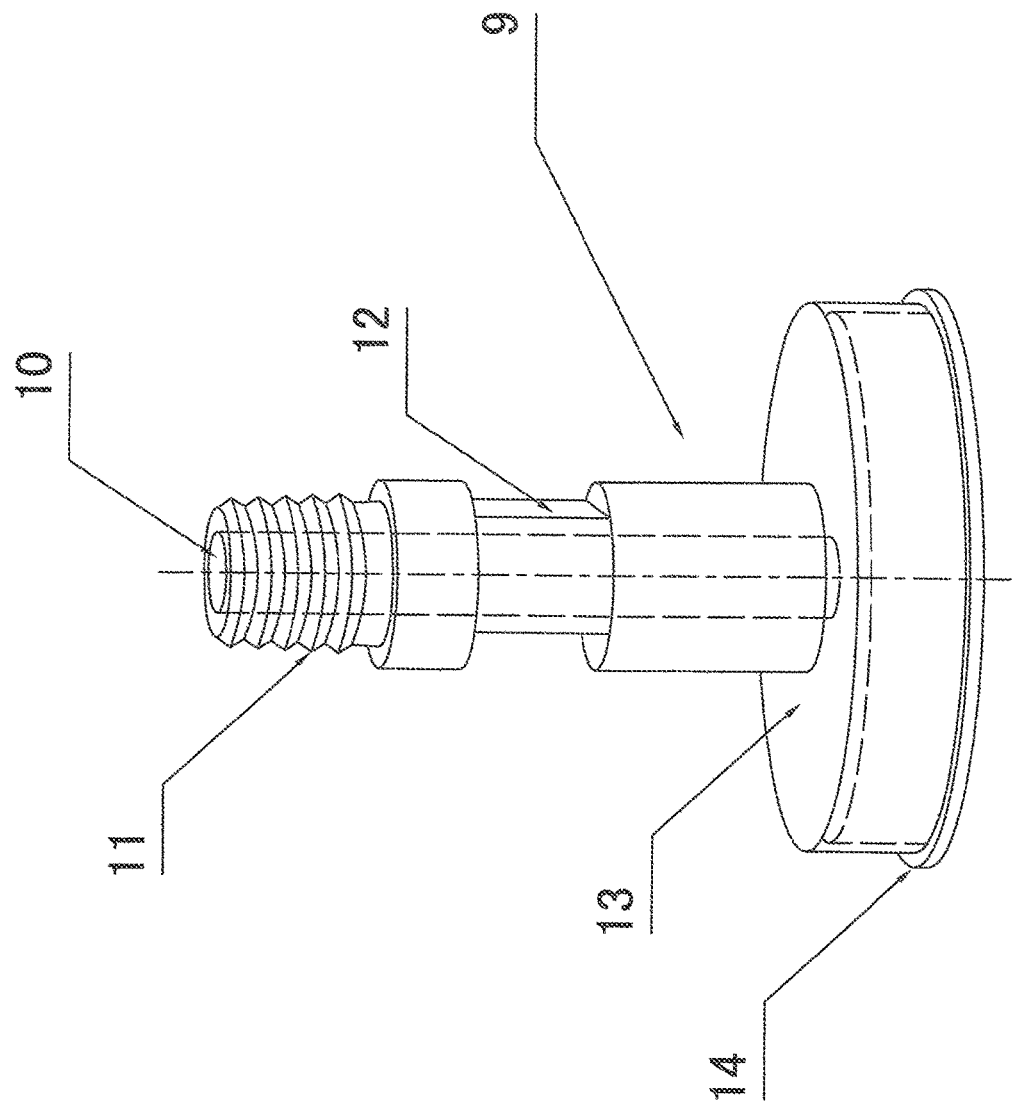
FIG. 3 shows a concept chart of Connection Fitting (9) using the references of (10) Penetration Hole, (11) Taper Screw, (12) Wrench Ditch, (13) Connection Base and (14) End Stop.

FIG. 3 shows a concept chart of a Connection Fitting (9). The Connection Fitting (9) is composed of Penetration Hole (10), Taper Screw (11), Wrench Ditch (12), Connection Base (13) and End Stop (14).

Connection Fitting is made of the stainless steel, the aluminum alloy, and magnesium alloys, etc. Penetration Hole (10) is opened in the center of Connection Fitting (9). The Penetration Hole (10) is extended wide at the bottom of the Connection Fitting (9). The upper part of the Connection Fitting (9) is Taper Screw (11). The Taper Screw (11) is used for piping. The middle part of the Connection Fitting (9) is Wrench Ditch (12). The Wrench Ditch (12) is used for the fixation of the piping work.

The bottom part of the Connection Fitting (9) is Connection Base (13). The cylindrical sidewall of the Connection Base (13) is thinned more than the upper surface of the Connection Base (13). The reason is that the Connection Fitting (9) is adhered to Metallic Tank (2) shown in the FIG. 1 by the silver brazing for the purpose of airtight. The wall thickness of Metallic Tank (2) is very thin, so when the cylindrical sidewall of Connection Base (13) is thick, it becomes difficult to work the silver brazing. If the cap end of a metallic tank can be thickened, Connection Fitting (9) and Metallic Tank (2) will be able to be welded. The end part of the Connection Fitting (9) is End Stop (14). The End Stop (14) prevents the Metallic Tank (2) from falling off by gravitation from the Connection Fitting (9) when silver brazing.

When the Metallic Tank (2) that is sealed up is pressurized the circumference stress and the axial stress are generated on the tank wall. The axial stress pushes out the Connection Fittings (9) from the Metallic Tank (2). There is no structural strength in silver brazing because the wall of the Metallic Tank (2) is too thin and the internal pressure is so high. The Connection Fitting (9) needs to be fixed to the Metallic Tank (2) more strongly than silver brazing. When a pair of Connection Fittings (9) is rounded with the FRP prepreg bandage in the direction of the length, a pair of Connection Fittings (9) is firmly fixed to the Metallic Tank (2) by FRP prepreg bandage. The diameter of the Connection Base (13) is made bigger than the diameter of the Taper Screw (11) so that the FRP prepreg bandage rounds the upper surface of the Connection Base (13) to the direction of the tank length.

Figure 4:
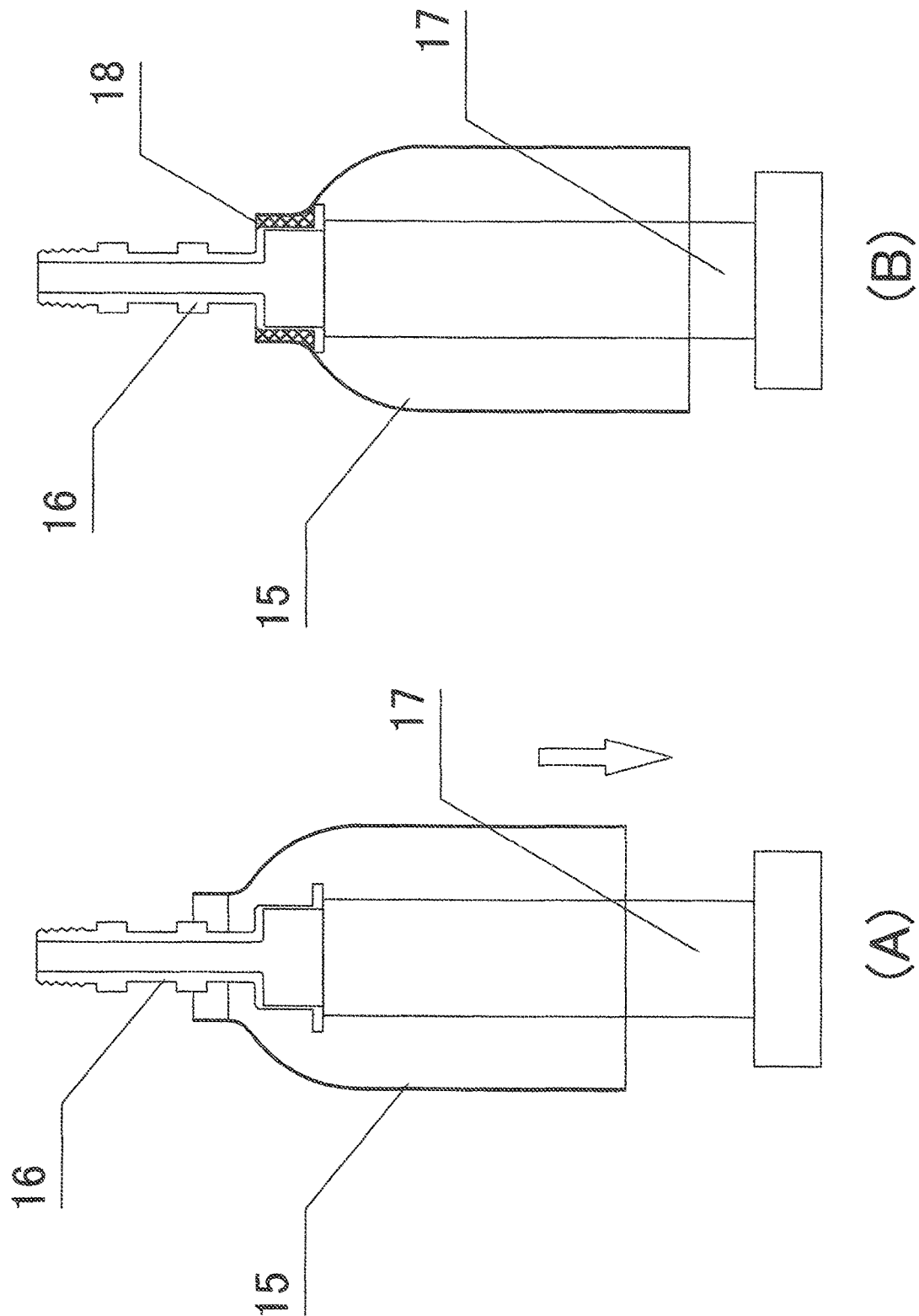
FIG. 4 (A) and FIG. 4 (B) show a manufacturing process chart of Silver Brazing using the references of (15) Metallic Tank, (16) Connection Fitting, (17) Support Stand and (18) Silver Brazing.

FIG. 4 (A) and FIG. 4 (B) show a manufacturing process chart of a Silver Brazing. The manufacturing process chart of a Silver Brazing is composed of Metallic Tank (15), Connection Fitting (16), Support Stand (17) and Silver Brazing (18).

Manufacturing process of Silver Brazing is silver brazing at the Metallic Tank (15) and the Connection Fitting (16). First of all, Connection Fitting (16) is placed on Support Stand (17). Support Stand (17) is a stand that puts Metallic Tank (15) and Connection Fitting (16). Next, Metallic Tank (15) is slowly placed on Connection Fitting (16). Metallic Tank (15) comes in contact with Connection Fitting (16) and stops because Connection Fitting (16) has End Stop (14) shown in the FIG. 3. Afterwards, Metallic Tank (15) and Connection Fitting (16) are brazed by Silver Brazing (18).

Figure 5:
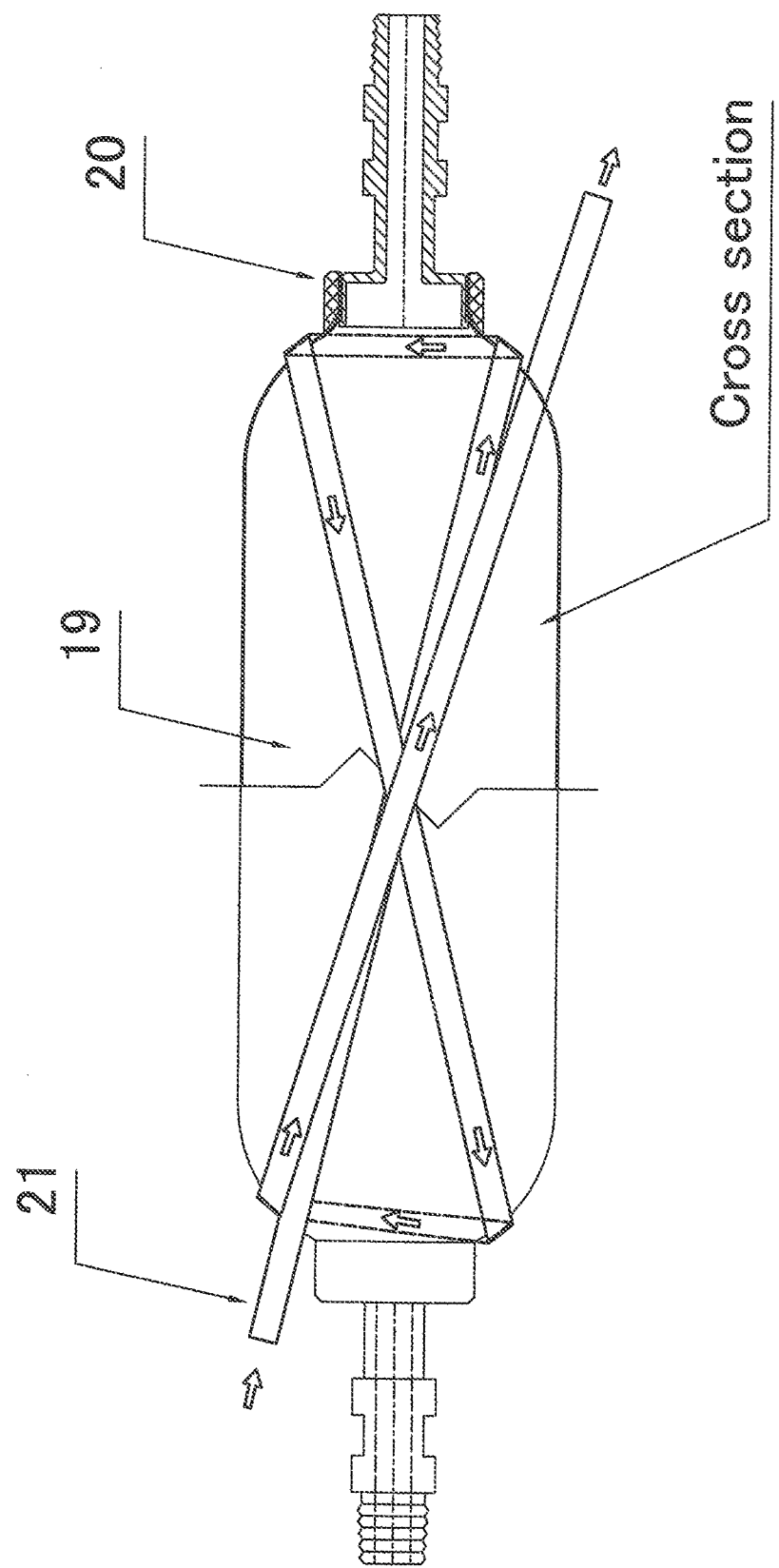
FIG. 5 shows a manufacturing process chart of Reinforcement Process Step One using the references of (19) Metallic Tank Assembly, (20) Reinforcement Ring and (21) FRP Prepreg Bandage For Step One.

FIG. 5 shows a manufacturing process chart of Reinforcement Process Step One. Reinforcement Process Step One is composed of Metallic Tank Assembly (19), Reinforcement Ring (20) and FRP prepreg Bandage For Step One (21).

Reinforcement Process Step One is the first step for reinforcing the Metallic Tank Assembly (19) with the FRP Prepreg Bandage For Step One (21). Metallic Tank Assembly (19) and Reinforcement Ring (20) are the same as Metallic Tank Assembly (1) and Reinforcement Ring (4) shown in FIG. 1. FRP Prepreg Bandage For Step One (21) is a long and slender cutting of the FRP Prepreg as like the bandage.

When a cylindrical tank that is sealed up is pressurized, two kinds of stresses are generated on the tank wall. One is an axial stress and another one is a circumference stress. Reinforcement Process Step One is the reinforcement method resisting to axial stress. When the FRP Prepreg Bandage For Step One (21) is wrapped to draw spiral S-character at both ends of the Metallic Tank Assembly (19), the surface of the Metallic Tank Assembly (19) is completely covered with the FRP Prepreg Bandage For Step One (21). To the result, the hoop stress is generated in the FRP Prepreg Bandage For Step One (21) because the FRP Prepreg Bandage For Step One (21) is continuously rolled around the Metallic Tank Assembly (19) many times.

It is not easy to roll the bandage axially of a long and slender cylinder tank. It is preferable that both ends of the cylinder tank are domed. And, some prop should stand at a domed center. The Reinforcement Ring (20) does the role of the prop for Metallic Tank Assembly (19).

Figure 6:
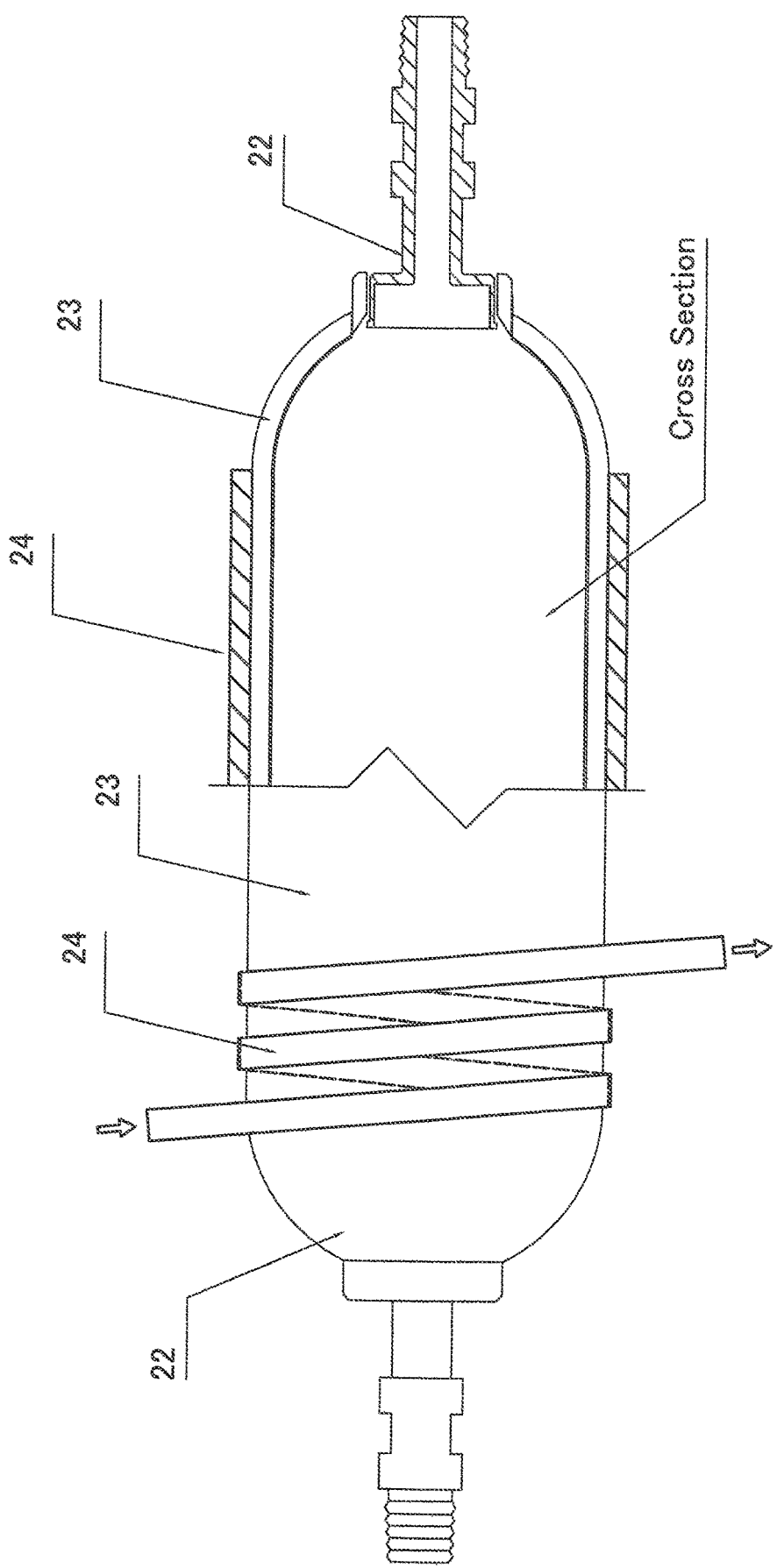
FIG. 6 shows a manufacturing process chart of Reinforcement Process Step Two using the references of (22) Metallic Tank Assembly, (23) FRP Prepreg Step One and (24) FRP Prepreg Bandage For Step Two.

FIG. 6 shows a manufacturing process chart of Reinforcement Process Step Two. Reinforcement Process Step Two is composed of Metallic Tank Assembly (22), FRP Prepreg Step One (23) and FRP Prepreg Bandage For Step Two (24). Metallic Tank Assembly (22) is the same as Metallic Tank Assembly (1) shown in FIG. 1. FRP Prepreg Step One (23) is the same as FRP Prepreg Bandage For Step One (21) shown in FIG. 5. The right side of FIG. 6 is a cross section.

Reinforcement Process Step Two is the reinforcement method that it opposes to the stress in the direction of circumference of tank. FRP Prepreg Bandage For Step Two (23) is wrapped on the FRP Prepreg Step One (23) in the direction of circumference of Metallic Tank Assembly (22), However, the FRP Prepreg Step One (23) is not completely covered with the FRP Prepreg Bandage For Step Two (24). Some collapse of continuous is caused when the bandage that has some width is wrapped around at the domed point of tank. Therefore, only the straight part of the FRP Prepreg Step One (23) is covered with the FRP Prepreg Bandage For Step Two (24).

Figure 7:
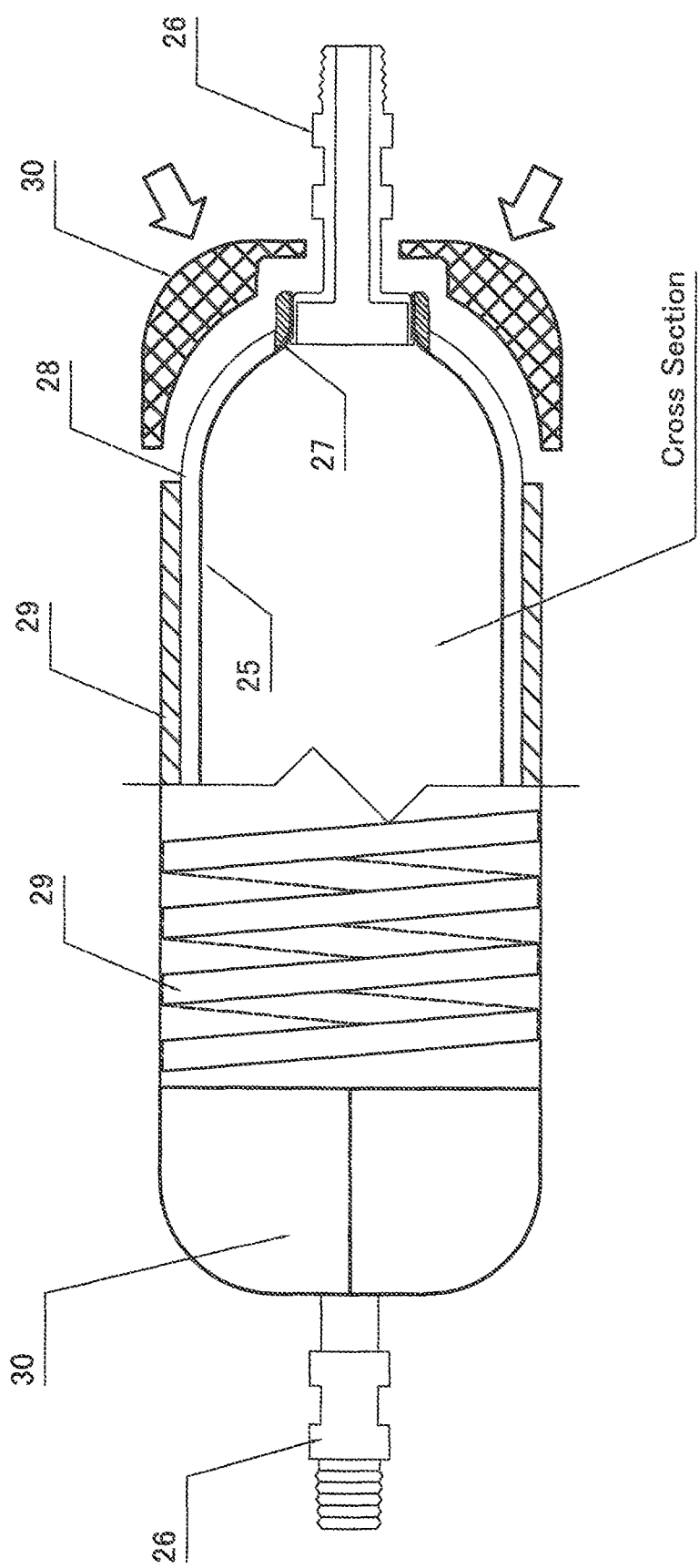
FIG. 7 shows a manufacturing process chart of Domed Molding-A Assembling using the references of (25) Metallic Tank, (26) Connection Fitting, (27) Reinforcement Ring, (28) FRP Prepreg Step One, (29) FRP Prepreg Step Two and (30) Domed Molding-A.

FIG. 7 shows a manufacturing process chart of Domed Molding-A Assembling. Domed Molding-A Assembling is composed of Metallic Tank (25), Connection Fitting (26), Reinforcement Ring (27), FRP Prepreg Step One (28), FRP Prepreg Step Two (29) and Domed Molding-A (30). The right side of FIG. 7 is a cross section.

Metallic Tank (25), Connection Fitting (26) and Reinforcement Ring (27) are the same as Metallic Tank (2), Connection Fitting (3) and Reinforcement Ring (4) shown in the FIG. 1. FRP Prepreg Step One (28) is the same as FRP Prepreg Bandage For Step One (21) shown in FIG. 5. FRP Prepreg Step Two (29) is the same as FRP Prepreg Bandage For Step Two (24) shown in FIG. 6.

Domed Molding-A (28) is made of a molding where carbon fiber is hardened with thermoplastic resin. The Domed Molding-A (28) is divided into two if necessary. Molding made from carbon fiber and thermoplastic resin is molded into any shape. And, it is light and strong. When heating it, the molding manufactured of a thermoplastic resin melts and it merges with the reinforcement material of thermosetting prepreg.

Domed Molding-A (30) has three purposes.
(1) The Domed Molding-A (30) strengthens the domed part of the FRP Prepreg Step One (28) that is not reinforced with FRP Prepreg Step Two (29).
(2) The Domed Molding-A (30) prevents the Connection Fitting (26) from being pushed out from the Metallic Tank (25) by internal pressure.
(3) The Domed Molding-A (28) increases the number of rolling of FRP Prepreg bandages resisting the circumference stress generated by internal pressure.

The FRP Prepreg Step One (28) is the shape of cocoon. The entire cocoon cannot be uniformly covered with a bandage because a bandage has some width. Therefore, the domed part of the FRP Prepreg Step One (28) is not reinforced by FRP Prepreg Step Two (29). The Domed Molding-A (30) strengthens the domed part of the FRP Prepreg Step One (28) that is not reinforced with FRP Prepreg Step Two (29).

Domed Molding-A (30) is installed at both ends of the tank assembly. The Domed Molding-A (30) covers the FRP Prepreg Step One (28), the Reinforcement Ring (27) and the Connection Fitting (26). When next FRP Prepreg bandage is wrapped to draw spiral S-character at both ends of tank assembly, the surface of the Domed Molding-A (30) is completely covered with the next FRP Prepreg bandage. Domed Molding-A (30), the Connection Fitting (26), and the Reinforcement Ring (27) are strongly fixed to the tank by next FRP Prepreg bandage. Therefore, The Domed Molding-A (30) prevents the Connection Fitting (26) from being pushed out from the Metallic Tank (25) by internal pressure.

The circumference stress generated in a high-pressure tank is twice the axial stress. It is necessary to roll the bandage to circumference direction more than the axial direction. However, the bandage to resist the circumference stress cannot be rolled on a domed part of the cocoon tank. The number of rolling of the circumference increases if a hemisphere part at both ends of the cocoon tank can be changed into the flatted dome in the process of reinforcement. A concrete method is as follows.
(1) The outside diameter of the Domed Molding-A (30) is made along outside line of the FRP Prepreg Step Two (29).

1. Domed Molding-A (30) is changed from a simple dome, which is tracing the Metallic Tank (25) externals, to the dome that puts on a cylinder skirt.
2. Externals of the Domed Molding-A (30) are cylinder as a whole and the ends are flatted dome.
(2) When a straight-line of cocoon tank increases, the number of circumference rolling of bandage increases. Therefore, the Domed Molding-A (30) increases the number of rolling of FRP Prepreg bandages that is resisting the circumference stress of high-pressure tank.

Figure 8:
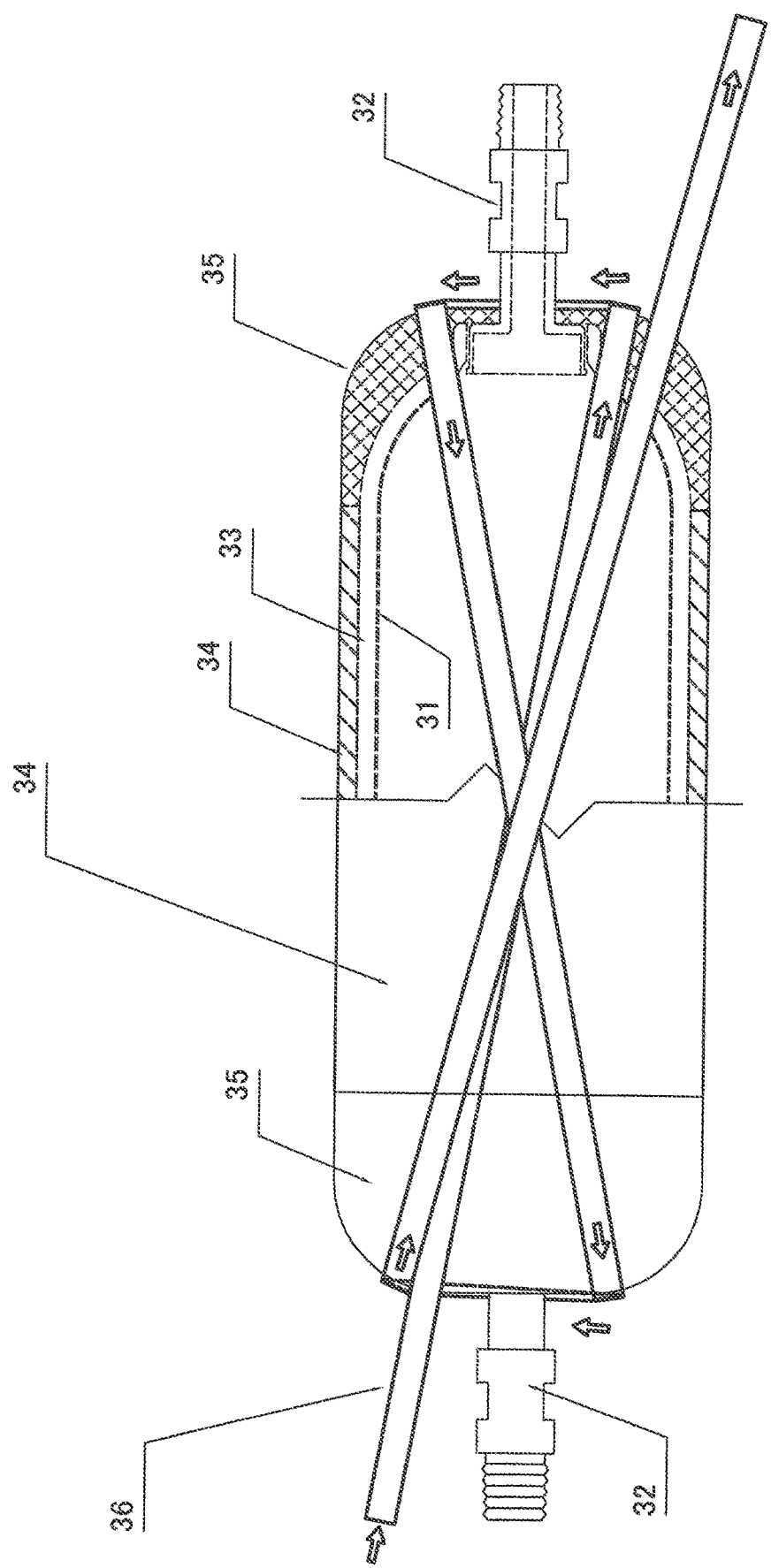
FIG. 8 shows a manufacturing process chart of Reinforcement Process Step Three using the references of (31) Metallic Tank Assembly, (32) Connection Fitting, (33) FRP Prepreg Step One, (34) FRP Prepreg Step Two, (35) Domed Molding-A and (36) FRP Prepreg Bandage For Step Three.

FIG. 8 shows a manufacturing process chart of Reinforcement Process Step Three. The Reinforcement Process Step Three is composed of Metallic Tank Assembly (31), Connection Fitting (32), FRP Prepreg Step One (33), FRP Prepreg Step Two (34), Domed Molding-A (35) and FRP Prepreg Bandage For Step Three (36).

Metallic Tank Assembly (31) and Connection Fitting (32) are the same as Metallic Tank Assembly (1) and Connection Fitting (3) shown in the FIG. 1. FRP Prepreg Step One (33) is the same as FRP Prepreg Bandage For Step One (21) shown in FIG. 5. FRP Prepreg Step Two (34) is the same as FRP Prepreg Bandage For Step Two (24) shown in FIG. 6. Domed Molding-A (35) is the same as Domed Molding-A (30) shown in FIG. 7.

The FRP Prepreg Bandage For Step Three (36) is rolled drawing spiral S-character at both ends of the Domed Molding-A (35). The surface of the FRP Prepreg Step Two (34) and the Domed Molding-A (35) is completely covered with the FRP Prepreg Bandage For Step Three (36). The Connection Fitting (32) is fixed to the Metallic Tank Assembly (31) by the FRP Prepreg Bandage For Step Three (36).

The FRP Prepreg Bandage For Step Three (36) is continuously rolled around the whole tank assembly many times. To the result, the hoop stress is generated in the FRP Prepreg Bandage For Step Three (36). The hoop stress generated in the FRP Prepreg Bandage For Step Three (36) corresponds to the axial stress generated by internal pressure.

Figure 9:
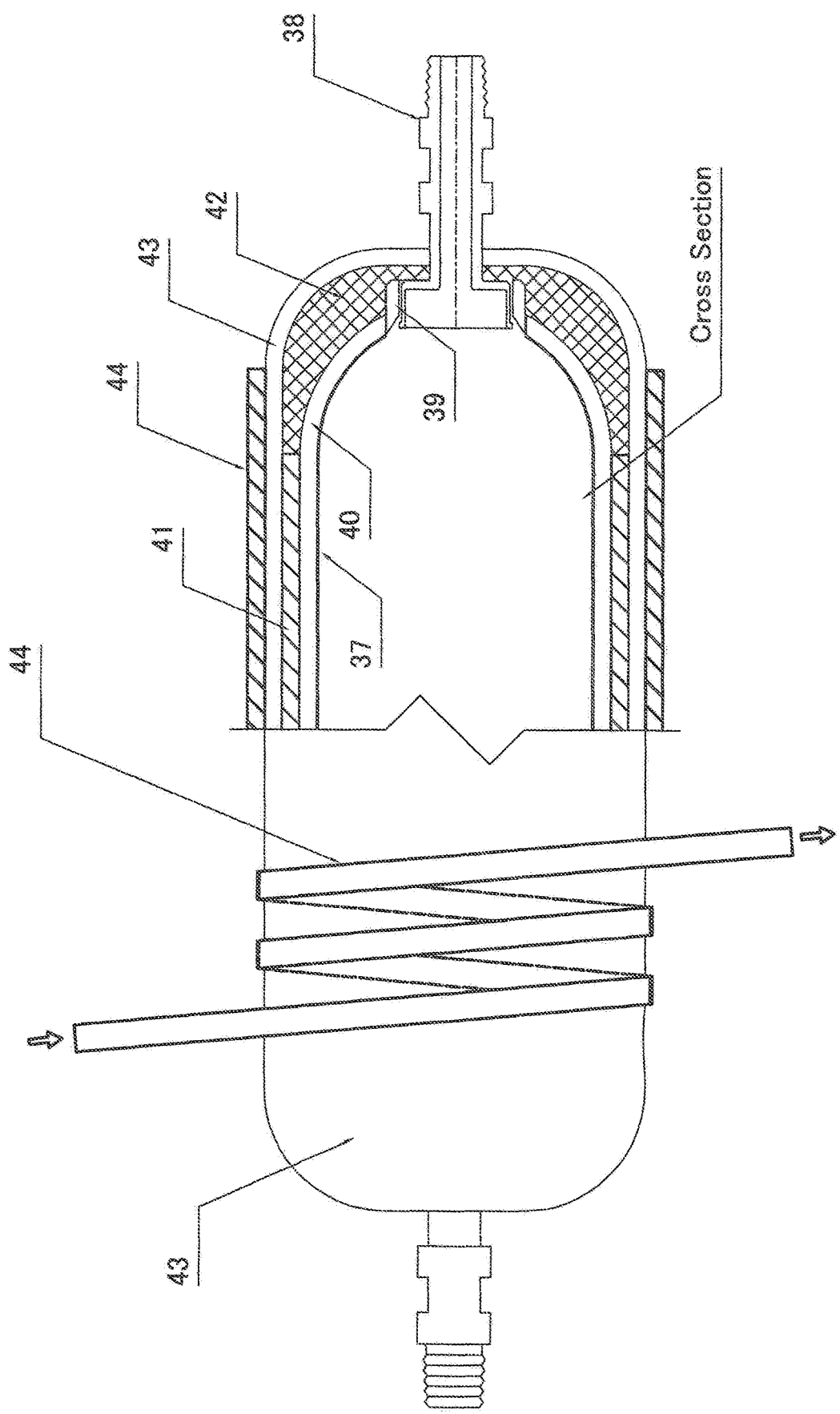
FIG. 9 shows a manufacturing process chart of Reinforcement Process Step Four using the references of (37) Metallic Tank, (38) Connection Fitting, (39) Reinforcement Ring, (40) FRP Prepreg Step One, (41) FRP Prepreg Step Two, (42) Domed Molding-A, (43) FRP Prepreg Step Three and (44) FRP Prepreg Bandage For Step Four.

FIG. 9 shows a manufacturing process chart of Reinforcement Process Step Four. Reinforcement Process Step Four is composed of Metallic Tank (37), Connection Fitting (38), Reinforcement Ring (39), FRP Prepreg Step One (40), FRP Prepreg Step Two (41), Domed Molding-A (42), FRP Prepreg Step Three (43) and FRP Prepreg Bandage For Step Four (44).

Metallic Tank (37), Connection Fitting (38) and Reinforcement Ring (39) are the same as Metallic Tank (2), Connection Fitting (3) and Reinforcement Ring (4) shown in the FIG. 1. FRP Prepreg Step One (40) is the same as FRP Prepreg Bandage For Step One (21) shown in FIG. 5. FRP Prepreg Step Two (41) is the same as FRP Prepreg Bandage For Step Two (24) shown in FIG. 6. Domed Molding-A (42) is the same as the Domed Molding-A (30) shown in FIG. 7. FRP Prepreg Step Three (43) is the same as FRP Prepreg Bandage For Step Three (36) shown in FIG. 8.

FRP Prepreg Bandage For Step Four (44) is the FRP prepreg bandage of a short pitch in which it resists the circumference stress. When a straight-line part on the surface of the tank increases, the more prepreg bandage of a short pitch in which it resists the circumference stress is rolled on the surface of the tank and it is possible to apply it. The Domed Molding-A (42) increases the number of rolling of FRP Prepreg Bandage For Step Four (44) compared with FRP Prepreg Step Two (41).

Figure 10:
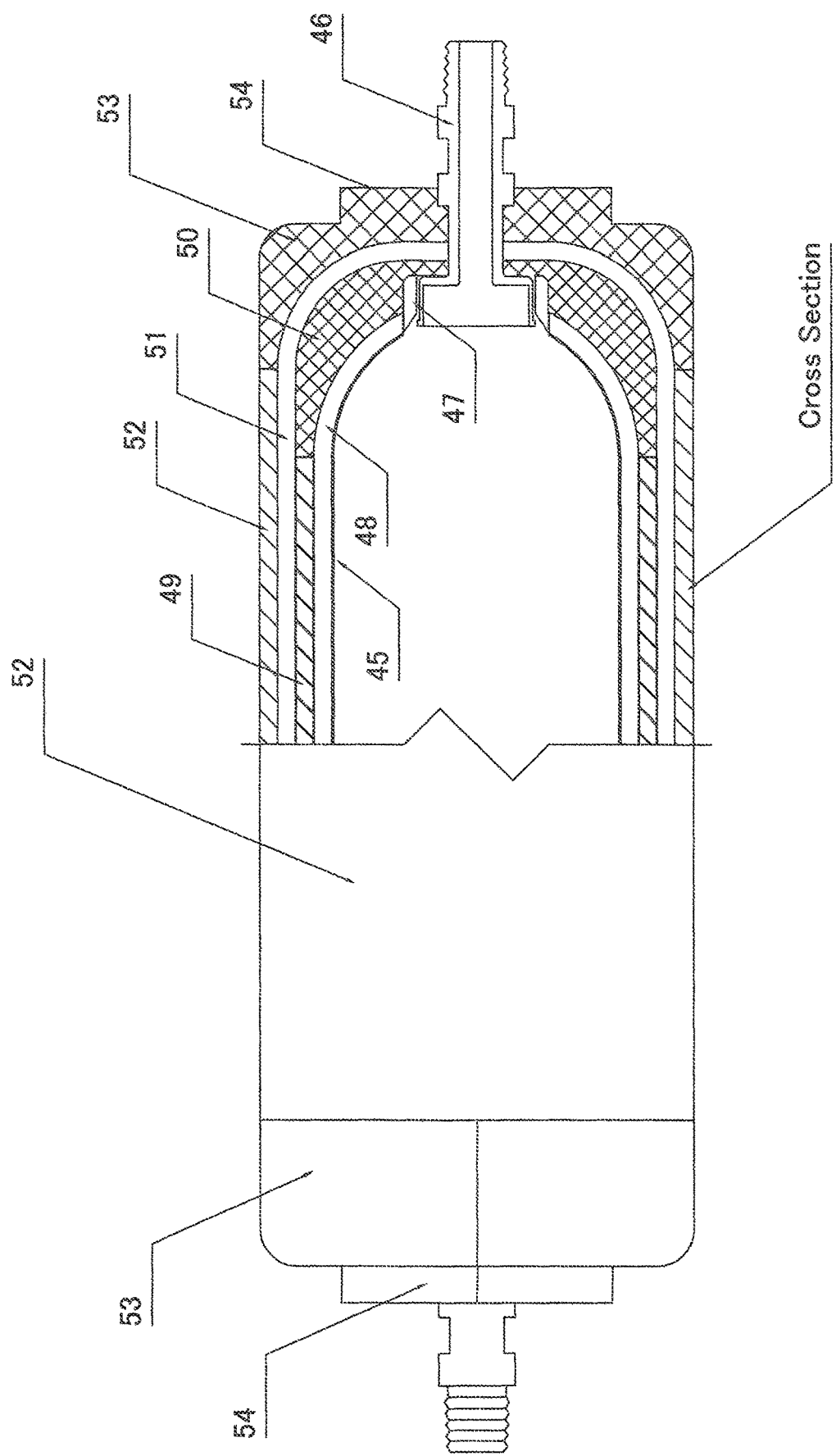
FIG. 10 shows a manufacturing process chart of Domed Molding-B Assembling using the references of (45) Metallic Tank, (46) Connection Fitting, (47) Reinforcement Ring, (48) FRP Prepreg Step One, (49) FRP Prepreg Step Two, (50) Domed Molding-A, (51) FRP Prepreg Step Three, (52) FRP Prepreg Step Four, (53) Domed Molding-B and (54) Convex Prop.

FIG. 10 shows a manufacturing process chart of Domed Molding-B Assembling. Domed Molding-B Assembling is composed of Metallic Tank (45), Connection Fitting (46), Reinforcement Ring (47), FRP Prepreg Step One (48), FRP Prepreg Step Two (49), Domed Molding-A (50), FRP Prepreg Step Three (51), FRP Prepreg Step Four (52), Domed Molding-B (53) and Convex Prop (54).

Metallic Tank (45), Connection Fitting (46) and Reinforcement Ring (47) are the same as Metallic Tank (2), Connection Fitting (3) and Reinforcement Ring (4) shown in the FIG. 1. FRP Prepreg Step One (48) is the same as FRP Prepreg Bandage For Step One (21) shown in FIG. 5. FRP Prepreg Step Two (49) is the same as FRP Prepreg Bandage For Step Two (24) shown in FIG. 6. Domed Molding-A (50) is the same as the Domed Molding-A (30) shown in FIG. 7. FRP Prepreg Step Three (51) is the same as FRP Prepreg Bandage For Step Three (36) shown in FIG. 8. FRP Prepreg Step Four (52) is the same as FRP Prepreg Bandage For Step Four (44) shown in FIG. 9.

The material, the process of manufacture, and the purpose of Domed Molding-B (53) are the same as Domed Molding-A (50). The difference between Domed Molding-A (50) and Domed Molding-B (53) is Convex Prop (54) at the end of Domed Molding-B (53). The Domed Molding-B (53) looks like a straight column compared with Domed Molding-A (50). When the shape of domed molding becomes a long column, the end shape of the domed molding becomes a flat surface from a domed surface. When the domed end becomes a flat surface, the reinforcement FRP prepreg bandage cannot draw spiral S-character at both ends of the Domed Molding-B (53). Convex Prop (54) helps the FRP prepreg bandage to roll uniformly at the end of the Domed Molding-B (53).

Figure 11:
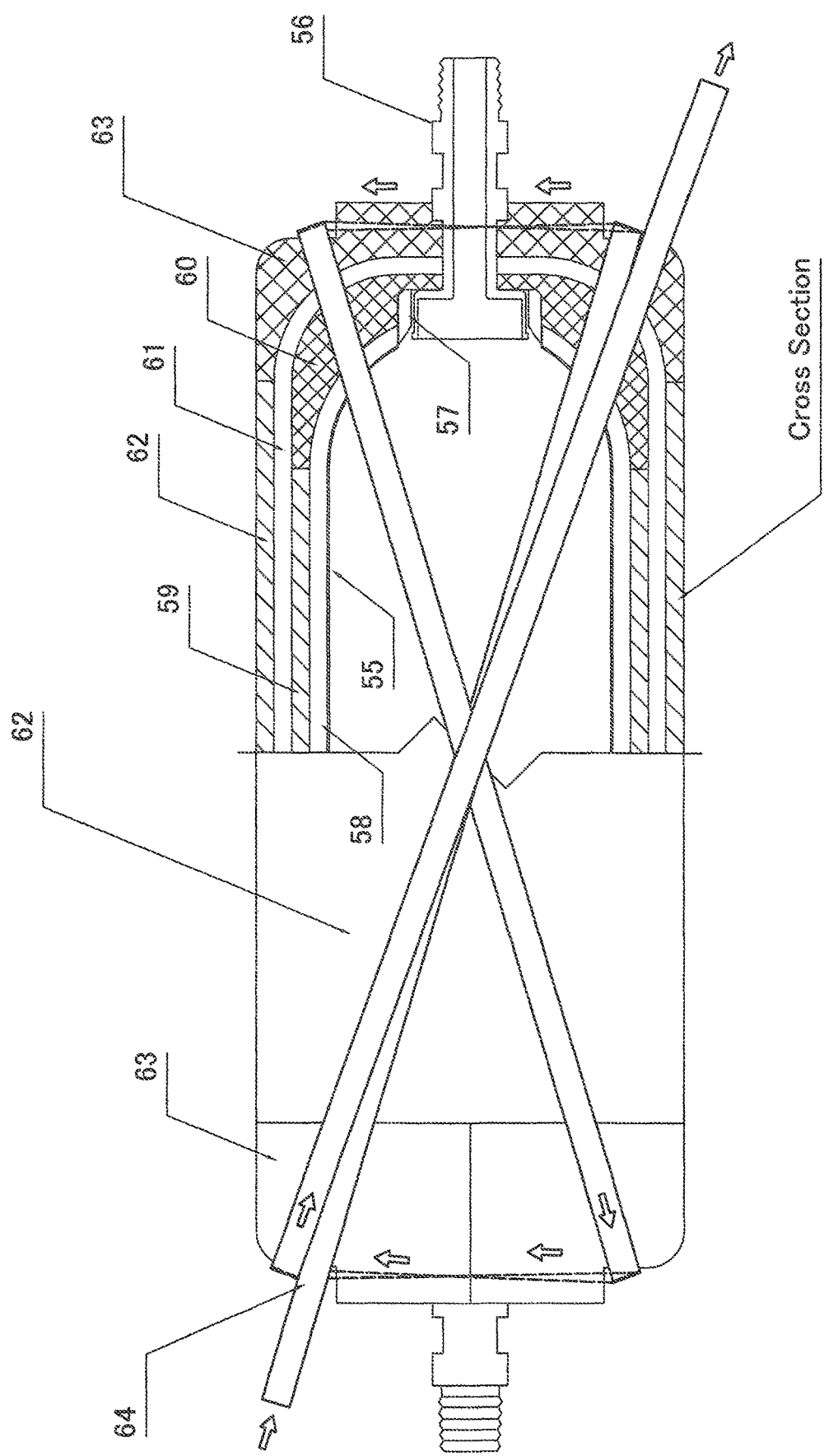
FIG. 11 shows a manufacturing process chart of Reinforcement Process Step Five using the references of (55) Metallic Tank, (56) Connection Fitting, (57) Reinforcement Ring, (58) FRP Prepreg Step One, (59) FRP Prepreg Step Two, (60) Domed Molding-A, (61) FRP Prepreg Step Three, (62) FRP Prepreg Step Four, (63) Domed Molding-B and (64) FRP Prepreg Bandage For Step Five.

FIG. 11 shows a manufacturing process chart of Reinforcement Process Step Five. The Reinforcement Process Step Five is composed of Metallic Tank (55), Connection Fitting (56), Reinforcement Ring (57), FRP Prepreg Step One (58), FRP Prepreg Step Two (59), Domed Molding-A (60), FRP Prepreg Step Three (61), FRP Prepreg Step Four (62), Domed Molding-B (63) and FRP Prepreg Bandage For Step Five (64).

Metallic Tank (55), Connection Fitting (56) and Reinforcement Ring (57) are the same as Metallic Tank (2), Connection Fitting (3) and Reinforcement Ring (4) shown in the FIG. 1. FRP Prepreg Step One (58) is the same as FRP Prepreg Bandage For Step One (21) shown in FIG. 5. FRP Prepreg Step Two (59) is the same as FRP Prepreg Bandage For Step Two (24) shown in FIG. 6. Domed Molding-A (60) is the same as the Domed Molding-A (30) shown in FIG. 7. FRP Prepreg Step Three (61) is the same as FRP Prepreg Bandage For Step Three (36) shown in FIG. 8. FRP Prepreg Step Four (62) is the same as FRP Prepreg Bandage For Step Four (44) shown in FIG. 9. Domed Molding-B (63) is the same as Domed Molding-B (53) shown in FIG. 10.

It is not easy to roll the bandage axially of a long and slender column. It is preferable that both ends of the column are domed. And, some prop should stand at a domed center. The Reinforcement Process Step Five is almost same as the Reinforcement Process Step Three shown in the FIG. 8. The FRP Prepreg Bandage For Step Five (64) is wrapped to draw spiral S-character at both ends of the Convex Prop of Domed Molding-B (53). The surface of the reinforced tank assembly is completely covered with the FRP Prepreg Bandage For Step Five (64) and it prevents the Connection Fitting (56) being pushed out from the Metallic Tank (55). And it resist to the axial stress generated by internal pressure.

Figure 12:
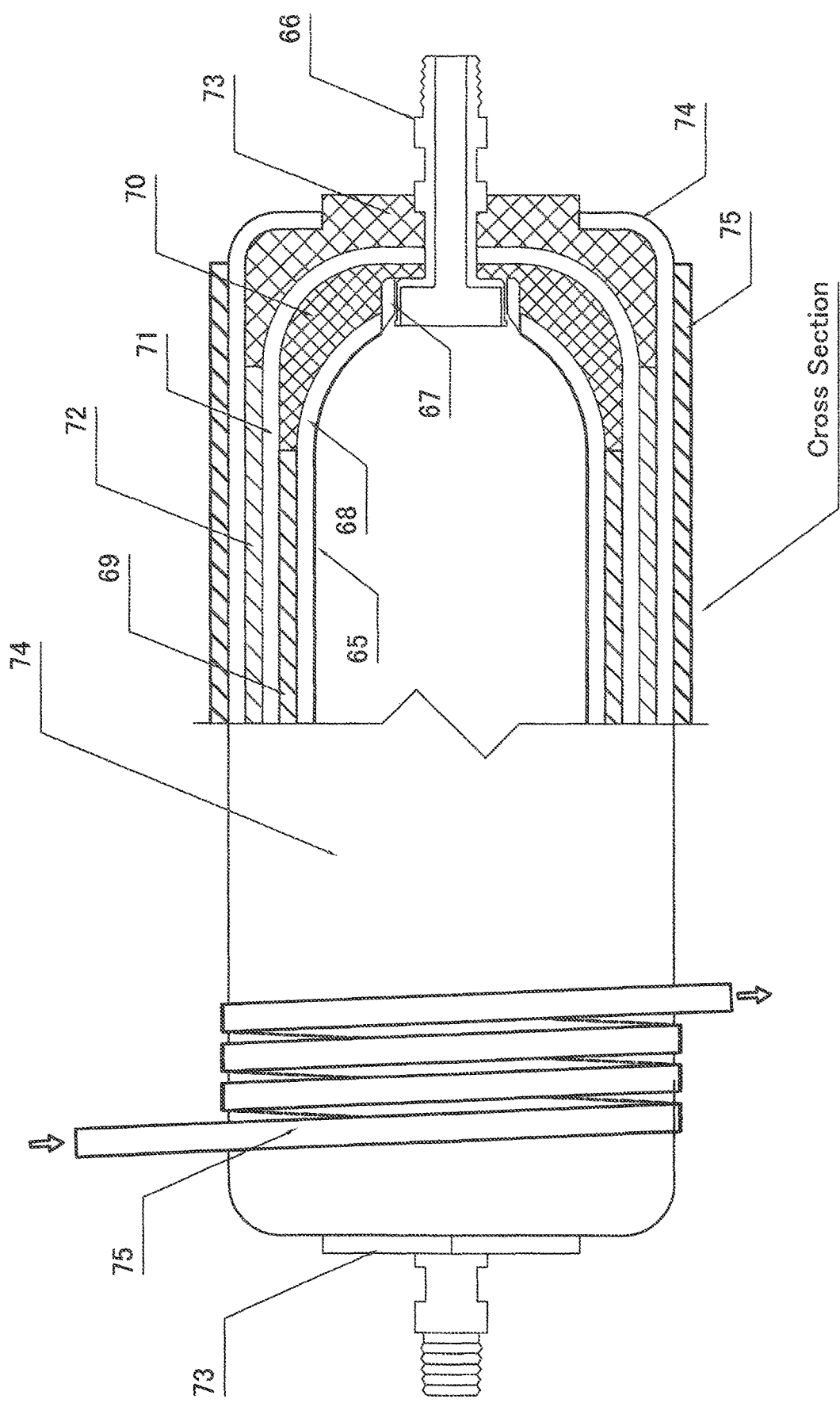
FIG. 12 shows a manufacturing process chart of Reinforcement Process Step Six using the references of (65) Metallic Tank, (66) Connection Fitting, (67) Reinforcement Ring, (68) FRP Prepreg Step One, (69) FRP Prepreg Step Two, (70) Domed Molding-A, (71) FRP Prepreg Step Three, (72) FRP Prepreg Step Four, (73) Domed Molding-B, (74) FRP Prepreg Step Five and (75) FRP Prepreg Bandage For Step Six

FIG. 12 shows a manufacturing process chart of Reinforcement Process Step Six. The Reinforcement Process Step Six is composed of Metallic Tank (65), Connection Fitting (66), Reinforcement Ring (67), FRP Prepreg Step One (68), FRP Prepreg Step Two (69), Domed Molding-A (70), FRP Prepreg Step Three (71), FRP Prepreg Step Four (72), Domed Molding-B (73), FRP Prepreg Step Five (74) and FRP Prepreg Bandage For Step Six (75).

Metallic Tank (65), Connection Fitting (66) and Reinforcement Ring (67) are the same as Metallic Tank (2), Connection Fitting (3) and Reinforcement Ring (4) shown in the FIG. 1. FRP Prepreg Step One (68) is the same as FRP Prepreg Bandage For Step One (21) shown in FIG. 5. FRP Prepreg Step Two (69) is the same as FRP Prepreg Bandage For Step Two (24) shown in FIG. 6. Domed Molding-A (70) is the same as the Domed Molding-A (30) shown in FIG. 7. FRP Prepreg Step Three (71) is the same as FRP Prepreg Bandage For Step Three (36) shown in FIG. 8. FRP Prepreg Step Four (72) is the same as FRP Prepreg Bandage For Step Four (44) shown in FIG. 9. Domed Molding-B (73) is the same as Domed Molding-B (53) shown in FIG. 10. FRP Prepreg Step Five (74) is the same as FRP Prepreg Bandage For Step Five (64) shown in FIG. 11.

Reinforcement Process Step Six is almost same as Reinforcement Process Step Four. FRP Prepreg Bandage For Step Six (75) is the prepreg bandage of a short pitch in which it resists the stress in direction of circumference.

Figure 13:
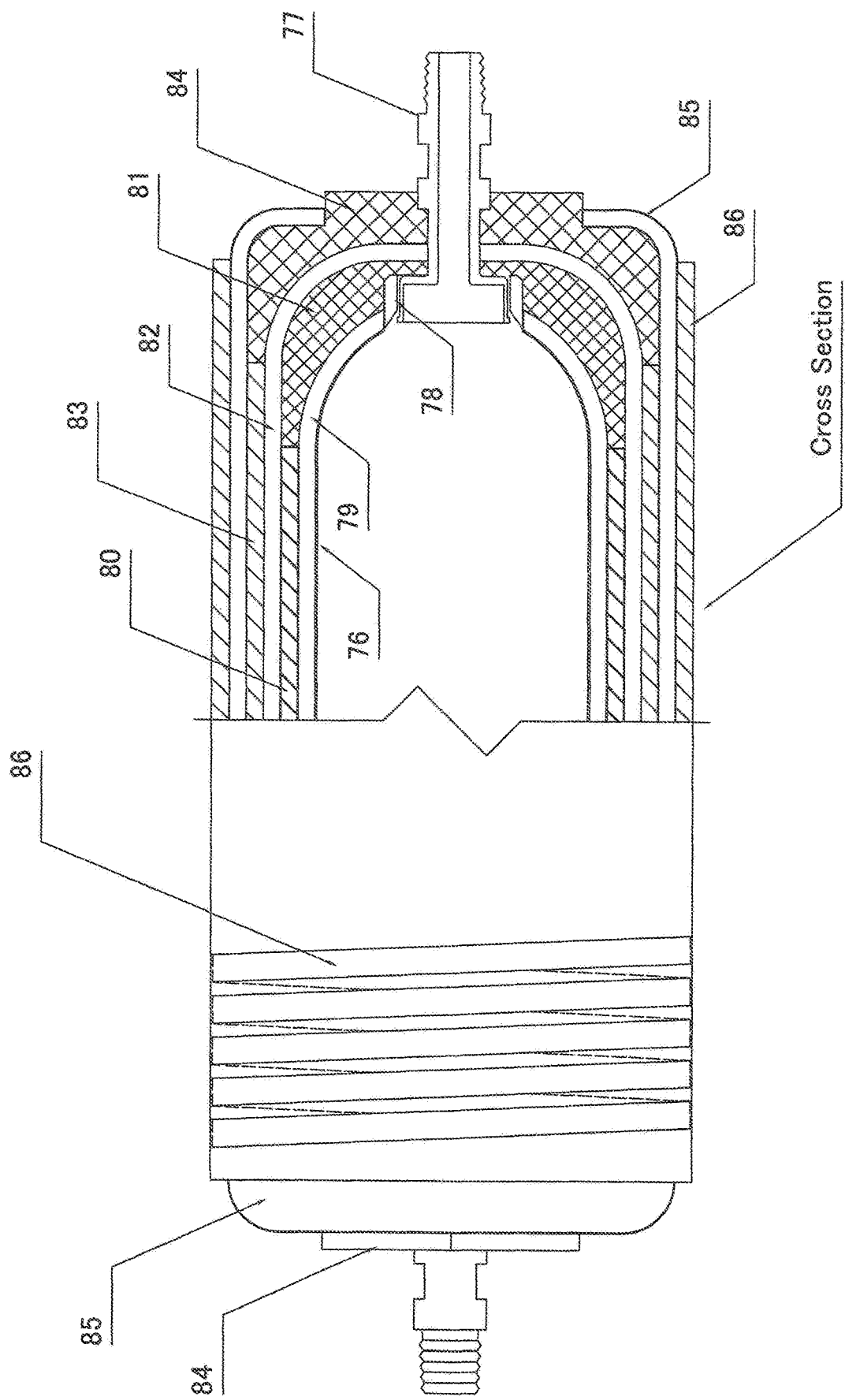
FIG. 13 shows an INTERNAL METALLIC TANK ASSEMBLY using the references of (76) Metallic Tank, (77) Connection Fitting, (78) Reinforcement Ring, (79) FRP Prepreg Step One, (80) FRP Prepreg Step Two, (81) Domed Molding-A, (82) FRP Prepreg Step Three, (83) FRP Prepreg Step Four, (84) Domed Molding-B, (85) FRP Prepreg Step Five and (86) FRP Prepreg Step Six

FIG. 13 shows an INTERNAL METALLIC TANK ASSEMBLY. The INTERNAL METALLIC TANK ASSEMBLY is composed of Metallic Tank (76), Connection Fitting (77), Reinforcement Ring (78), FRP Prepreg Step One (79), FRP Prepreg Step Two (80), Domed Molding-A (81), FRP Prepreg Step Three (82), FRP Prepreg Step Four (83), Domed Molding-B (84), FRP Prepreg Step Five (85) and FRP Prepreg Step Six (86).

Metallic Tank (76), Connection Fitting (77) and Reinforcement Ring (78) are the same as Metallic Tank (2), Connection Fitting (3) and Reinforcement Ring (4) shown in the FIG. 1. FRP Prepreg Step One (79) is the same as FRP Prepreg Bandage For Step One (21) shown in FIG. 5. FRP Prepreg Step Two (80) is the same as FRP Prepreg Bandage For Step Two (24) shown in FIG. 6. Domed Molding-A (81) is the same as the Domed Molding-A (30) shown in FIG. 7. FRP Prepreg Step Three (82) is the same as FRP Prepreg Bandage For Step Three (36) shown in FIG. 8. FRP Prepreg Step Four (83) is the same as FRP Prepreg Bandage For Step Four (44) shown in FIG. 9. Domed Molding-B (84) is the same as Domed Molding-B (53) shown in FIG. 10. FRP Prepreg Step Five (85) is the same as FRP Prepreg Bandage For Step Five (64) shown in FIG. 11. FRP Prepreg Step Six (86) is the same as FRP Prepreg Bandage For Step Six (75) shown in FIG. 12.

The stress generated in INTERNAL METALLIC TANK ASSEMBLY by internal pressure is a circumference stress and an axial stress. Theoretically, the circumference stress is twice the axial stress. The feature of main structural material in this invention that composes INTERNAL METALLIC TANK ASSEMBLY is as follows.

(1) Metallic Tank (76) does the role of the balloon that swells with internal air pressure. Metallic Tank (76) only prevents the gas sealed up in the tank from penetrating the tank wall. Metallic Tank (76) does not have structural strength.

(2) The Connection Fitting (77) has adhered to both ends of the INTERNAL METALLIC TANK ASSEMBLY. The Connection Fitting (77) continuously connects the INTERNAL METALLIC TANK ASSEMBLY for HONEYCOMB STRUCTURAL HIGH-PRESSURE SET TANK.

(3) Reinforcement Ring (78) is reinforcement of the silver brazing. The wall of Metallic Tank (76) in this invention is very thin. When a big load hangs to the silver brazing where the Connection Fitting (77) and the Metallic Tank (76) are joined, the silver brazing is easily broken. Reinforcement Ring (78) prevents the silver brazing from being destroyed.
(4) FRP Prepreg Step One (79) resists the axial stress generated in the INTERNAL METALLIC TANK ASSEMBLY. The FRP Prepreg Step One (79) covers all surfaces of the Metallic Tank (76).
(5) FRP Prepreg Step Two (80) resists the circumference stress generated in the INTERNAL METALLIC TANK ASSEMBLY. The FRP Prepreg Step Two (80) cannot cover all surfaces of the FRP Prepreg Step One (79). It covers only a straight part of the FRP Prepreg Step One (79).
(6) Domed Molding-A (81) has three purposes.
  1. Domed Molding-A (81) strengthens the domed part of the INTERNAL METALLIC TANK ASSEMBLY that is not covered with FRP Prepreg Step Two (80).
  2. Domed Molding-A (81) prevents Connection Fitting (77) from being pushed out from Metallic Tank (76) by internal pressure.
  3. Domed Molding-A (81) increases the number of rolling of FRP prepreg bandages resisting the circumference stress.
(7) FRP Prepreg Step Three (82) has two purposes.
  1. FRP Prepreg Step Three (82) fixes Domed Molding-A (81) to the INTERNAL METALLIC TANK ASSEMBLY with FRP prepreg bandage.
  2. FRP Prepreg Step Three (82) resists the axial stress.
(8) FRP Prepreg Step Four (83) resists the circumference stress. The rolling number of the FRP Prepreg Step Four (83) increases more than the rolling number of the RP Prepreg Step Two (80).
(9) Domed Molding-B (84) has four purposes.
  1. Domed Molding-B (84) strengthens the domed part of the INTERNAL METALLIC TANK ASSEMBLY that is not covered with FRP Prepreg Step Four (83).
  2. Domed Molding-B (84) prevents Connection Fitting (77) from being pushed out from Metallic Tank (76) by internal pressure.
  3. Domed Molding-B (84) increases the number of rolling of FRP prepreg bandages resisting the circumference stress.
  4. Domed Molding-B (84) makes it easy to roll spiral S-character axially because a Convex Prop is placed at the center of a flat hemisphere of Domed Molding-B (84).
(10) FRP Prepreg Step Five (85) has two purposes.
  1. FRP Prepreg Step Five (85) fixes Domed Molding-B (84) to the INTERNAL METALLIC TANK ASSEMBLY with FRP prepreg bandage.
  2. FRP Prepreg Step Five (85) resists the axial stress.
(11) FRP Prepreg Step Six (86) resists the circumference stress. When the FRP Prepreg Step Two (80), the FRP Prepreg Step Four (83) and the FRP Prepreg Step Six (86) are compared, the range that the FRP Prepreg Step Six (86) covers is the widest. However, when it is possible to correspond enough to the circumference stress by the FRP Prepreg Step Two (80) and the FRP Prepreg Step Four (83), the FRP Prepreg Step Six (86) is unnecessary.

FIG. 13 shows the passage of the development of this invention. Domed Molding-A (81) is made of paper clay because there was no metal mold that makes the Domed Molding-A (81) with a FRP thermoplastic resin. If the cylinder that covers the Metallic Tank (76) is made of a FRP thermoplastic resin, and Domed Molding-A (81) is matched to external surface of the Metallic Tank (76), FRP Prepreg Step One (79) and FRP Prepreg Step Two (80) might be omissible.

Figure 14:
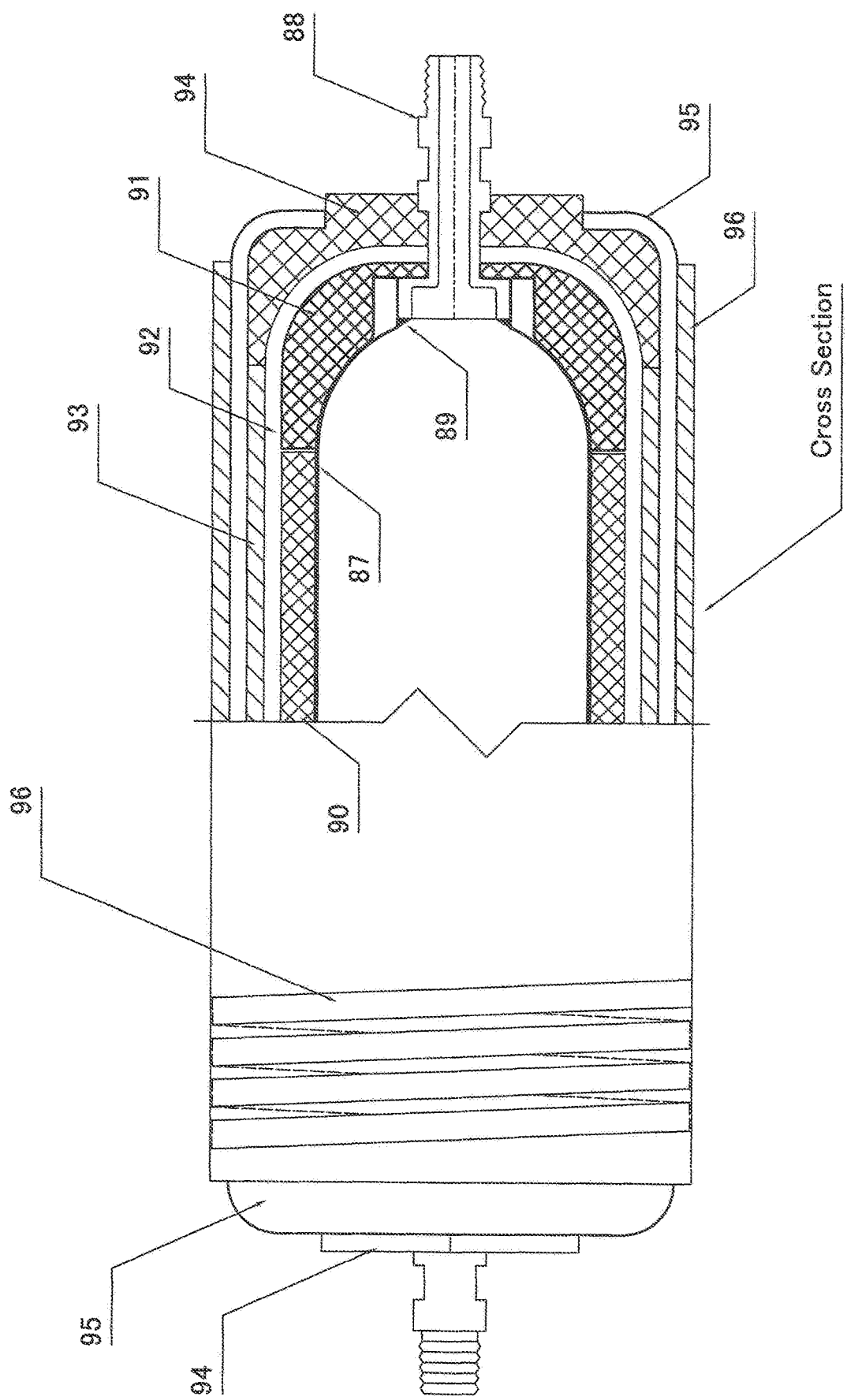
FIG. 14 shows a Modified INTERNAL METALLIC TANK ASSEMBLY using the references of (87) Modified Metallic Tank, (88) Connection Fitting, (89) Airtight Welding, (90) Cylinder Molding-A, (91) Domed Molding-A, (92) FRP Prepreg Step Three, (93) FRP Prepreg Step Four, (94) Domed Molding-B, (95) FRP Prepreg Step Five and (96) FRP Prepreg Step Six

FIG. 14 shows a Modified INTERNAL METALLIC TANK ASSEMBLY. The Modified INTERNAL METALLIC TANK ASSEMBLY is composed of Modified Metallic Tank (87), Connection Fitting (88), Airtight Welding (89), Cylinder Molding-A (90), Domed Molding-A (91), FRP Prepreg Step Three (92), FRP Prepreg Step Four (93), Domed Molding-B (94), FRP Prepreg Step Five (95) and FRP Prepreg Step Six (96).

Domed Molding-A (91) is the same as the Domed Molding-A (30) shown in FIG. 7. FRP Prepreg Step Three (92) is the same as FRP Prepreg Bandage For Step Three (36) shown in FIG. 8. FRP Prepreg Step Four (93) is the same as FRP Prepreg Bandage For Step Four (44) shown in FIG. 9. Domed Molding-B (94) is the same as Domed Molding-B (53) shown in FIG. 10.

FRP Prepreg Step Five (95) is the same as FRP Prepreg Bandage For Step Five (64) shown in FIG. 11. FRP Prepreg Step Six (96) is the same as FRP Prepreg Bandage For Step Six (75) shown in FIG. 12.

Modified Metallic Tank (87) is a metallic tank where the wall thickness of the cap part of the Metallic Tank (1) shown in FIG. 1 is thickened. More accurately, the Modified Metallic Tank (87) is the one where the cap part of the Head Part (4) shown in FIG. 2 is thickened. The Head Part (4) where the cap part is thickened is manufactured from the forge. The Reinforcement Ring (3) becomes unnecessary by the cap of a metallic tank becoming thick. And, the Connection Fitting (88) is welded directly to the Modified Metallic Tank (87) by the Airtight Welding (89). However, it is similar to the Metallic Tank (1) that there is no structural strength in the Modified Metallic Tank (87).

Cylinder Molding-A (90) is made from molding where carbon fiber is hardened with thermoplastic resin. However, the molding cylinder is weak to the expanding stress. It might be preferable that the Cylinder Molding-A (90) is made of the FRP prepreg as well as FRP Prepreg Step Two (80) shown in FIG. 13.

It will be appreciated that modifications may be made in the present invention. This invention is the one invented to improve U.S. Pat. No. 8,917,809 B2 and NOZA-006. These internal tanks are manufactured from plastic. However, high-pressure gas of small molecule has possibility of penetrating the wall of plastic tank. It is preferable that the wall of a high-pressure tank, in which a gas of small molecule is stored, is made of metal. "U.S. Pat. No. 8,917,809 B2" and "NOZA-006" need some new technologies when an internal tank is manufactured from metal.

The spirit of this invention is a technical advancement of U.S. Pat. No. 8,917,809 B2 and NOZA-006 with new manufacturing facilities. For that purpose, this invention developed the manufacturing process for the internal metallic tank assembly for honeycomb structural high-pressure set tank. Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

I claim:

1. A reinforced storage container for volatile gases, comprising:
   a metal storage tank having first and second domed end portions and a main body portion;
   first and second connection fittings fixedly mounted on the first and second domed ends of the metal storage tank, respectively;
   first and second reinforcing rings fixedly formed to surround base portions of the first and second connection fittings connected to the storage tank;
   a first prepreg reinforcing layer formed directly on the metal storage tank, the first prepreg reinforcing layer including at least one elongated prepreg bandage wrapped in a spiral S-shaped form along an axial direction of the storage tank and extending to the first and second domed ends of the storage tank;
   a second prepreg reinforcing layer directly on the first prepreg reinforcing layer to enclose the metal storage tank, the second prepreg reinforcing layer including at least one elongated prepreg bandage wrapped circumferentially around the main body portion of the metal storage tank; and
   first and second molded dome portions fixedly mounted to cover the first and second domed end portions wrapped in the first prepreg reinforcing layer, the first and second reinforcing rings and the base portions of the first and second connection fittings.

2. A reinforced storage container according to claim 1, further comprising:
   a third prepreg reinforcing layer enclosing the storage tank directly on the second prepreg reinforcing layer, the third prepreg reinforcing layer including at least one elongated prepreg bandage wrapped in a spiral S-shaped form along an axial direction of the storage tank and extending to the first and second domed ends of the storage tank to cover the second prepreg reinforcing layer and the first and second molded dome portions;
   a fourth prepreg reinforcing layer directly on the third prepreg reinforcing layer, the fourth prepreg reinforcing layer including at least one elongated prepreg bandage wrapped circumferentially around the main body portion of the storage tank; and
   third and fourth molded dome portions fixedly mounted to cover the first and second molded dome portions wrapped in the third prepreg reinforcing layer.

3. A reinforced storage container according to claim 2, further comprising:
   a fifth prepreg reinforcing layer directly on the fourth prepreg reinforcing layer, the fifth prepreg reinforcing layer including at least one elongated prepreg bandage wrapped in a spiral S-shaped form along an axial direction of the storage tank and extending to the third and fourth molded dome to cover the fourth prepreg reinforcing layer and the third and fourth molded dome portions; and
   a sixth prepreg reinforcing layer directly on the fifth prepreg reinforcing layer, the sixth prepreg reinforcing layer including at least one elongated prepreg bandage wrapped circumferentially around the main body portion of the storage tank.

4. A reinforced storage container according to claim 1, wherein the first and second connection fittings are fixedly mounted on the first and second domed ends of the storage tank with silver brazing.

5. A reinforced storage container according to claim 1, wherein the first and second reinforcing rings are made of metal.

6. A reinforced storage container according to claim 1, wherein the first and second molded dome portions are made of carbon fiber and thermoplastic resin.

7. A reinforced storage container according to claim 2, wherein the third and fourth molded dome portions are made of carbon fiber and thermoplastic resin.

8. A reinforced storage container according to claim 1, wherein each of the first and second connection fittings includes a connection neck having taper screw portion and a wrench ditch portion, and a connection base.

9. A reinforced storage container according to claim 1, wherein each of the first and second connection fittings is made of metal.

* * * * *